United States Patent
Augustin et al.

(10) Patent No.: US 8,895,650 B2
(45) Date of Patent: Nov. 25, 2014

(54) PHTHALATE-FREE ISOCYANURATE FORMULATIONS

(75) Inventors: Thomas Augustin, Köln (DE); Josef Sanders, Leverkusen (DE)

(73) Assignees: LANXESS Deutschland GmbH, Cologne (DE); Bayer Intellectual Property GmbH, Monheim am Rhein (DE)

( * ) Notice: Subject to any disclaimer, the term of this patent is extended or adjusted under 35 U.S.C. 154(b) by 143 days.

(21) Appl. No.: 13/813,746

(22) PCT Filed: Jul. 28, 2011

(86) PCT No.: PCT/EP2011/062976
§ 371 (c)(1),
(2), (4) Date: Jun. 13, 2013

(87) PCT Pub. No.: WO2012/016903
PCT Pub. Date: Feb. 9, 2012

(65) Prior Publication Data
US 2013/0261236 A1 Oct. 3, 2013

(30) Foreign Application Priority Data
Aug. 2, 2010 (DE) .......................... 10 2010 033 061

(51) Int. Cl.
| | | |
|---|---|---|
| C09D 7/12 | (2006.01) | |
| C08G 18/02 | (2006.01) | |
| C08G 18/76 | (2006.01) | |
| C08G 18/79 | (2006.01) | |
| C08K 5/101 | (2006.01) | |
| C09D 127/06 | (2006.01) | |
| C08K 5/3492 | (2006.01) | |
| C08K 5/29 | (2006.01) | |
| C08L 27/06 | (2006.01) | |

(52) U.S. Cl.
CPC ............ *C09D 7/1233* (2013.01); *C08G 18/022* (2013.01); *C09D 127/06* (2013.01); *C08L 27/06* (2013.01); *C08K 5/34924* (2013.01); *C08G 18/794* (2013.01); *C08K 5/29* (2013.01); *C08G 18/7621* (2013.01); *C08K 5/101* (2013.01)
USPC .......................................................... 524/197

(58) Field of Classification Search
CPC ........ C08G 18/02; C08G 18/76; C08G 18/79; C08K 5/101
USPC .......................................................... 524/197
See application file for complete search history.

(56) References Cited

U.S. PATENT DOCUMENTS

| | | |
|---|---|---|
| 3,996,223 A | 12/1976 | Gupta et al. |
| 4,115,373 A | 9/1978 | Henes et al. |
| 4,518,729 A | 5/1985 | Breidenbach et al. |
| 4,623,686 A | 11/1986 | Hurnik et al. |
| 6,936,678 B2 | 8/2005 | Brahm et al. |
| 7,776,768 B2 | 8/2010 | Hansel et al. |
| 2005/0049341 A1 | 3/2005 | Grass et al. |
| 2008/0287613 A1 | 11/2008 | Simon et al. |

FOREIGN PATENT DOCUMENTS

GB 1455701 11/1976

OTHER PUBLICATIONS

Tychopoulos et al., "Enhancement of the RAte of Mannich Reactions in Aqueous Media", Synth. Commun. 1986; 16:1401-1409, Abstract, available at http://www.researchgate.net/publication/233310360, Jun. 4, 2014.
International Search Report from International Application PCT/EP2011/062976 dated Nov. 3, 2011, 2 pages.

*Primary Examiner* — Vu A Nguyen
(74) *Attorney, Agent, or Firm* — Jennifer R. Seng

(57) ABSTRACT

The present invention relates to novel low-monomer low-viscosity high-activity formulations composed of isocyanurate containing isocyanate groups, exclusively based on 2,4-diisocyanatotoluene and phthalate-free plasticizers, to the use thereof as adhesion promoters with improved adhesion for coating compositions based on plasticized polyvinyl chloride, and to coatings and coated substrates.

12 Claims, No Drawings

PHTHALATE-FREE ISOCYANURATE FORMULATIONS

The present invention relates to low-monomer-content, low-viscosity preparations made of isocyanurate containing isocyanate groups and exclusively on the basis of 2,4-diisocyanatotoluene and of phthalate-free plasticizers, to the use of these as adhesion promoters for coating compositions based on plasticized polyvinyl chloride (PVC), and also to coatings and coated substrates.

It is known that the adhesion capability of plasticized PVC on substrates can be improved by adding, to the plasticized PVC, an adhesion promoter which contains isocyanate groups. This type of improved adhesion capability is important by way of example when the intention is to produce synthetic textile materials provided with a PVC covering. Preference is given to the use, as adhesion promoters, of isocyanurates which contain isocyanate groups and which can be produced by oligomerization, in particular trimerization, from diisocyanates. The diisocyanates normally used for this purpose are the mixtures which have good commercial availability and which comprise the isomeric diisocyanatotoluenes (TDI), composed mainly of 2,4-diisocyanatotoluene (2,4-TDI) and 2,6-diisocyanatotoluene (2,6-TDI). These can easily be converted almost completely to isocyanurates containing isocyanate groups. Almost complete conversion is necessary because operator safety and product safety require that the residual content of diisocyanates in the adhesion promoter preparation is kept below 1.0% by weight, preferably below 0.5% by weight. Diisocyanatodiphenylmethanes (MDI) are likewise readily available but are less suitable, and are more difficult than TDI to trimerize and can therefore lead to undesirably high residual content of diisocyanates. Isocyanurates which contain isocyanate groups and which are based on MDI moreover exhibit poor solubility and tend to crystallize.

Isocyanurates which contain isocyanate groups are particularly easy to handle as adhesion promoters when they are used in the form of a solution in a plasticizer. In a practical method, the isocyanurates which contain isocyanate groups and are derived from TDI are likewise produced in the plasticizer used. These adhesion promoters and adhesion promoter preparations containing plasticizers are described by way of example in DE 24 19 016 A12 (GB 1 455 701 A), as also are the preparation and use thereof.

For the purposes of the present invention, plasticizers are substances which on mixing with PVC, which is intrinsically hard and brittle, give a soft, tough material known as plasticized PVC. Examples of known plasticizers are the esters of phthalic acid, adipic acid or benzoic acid. Plasticized PVC can comprise large amounts of these plasticizers, sometimes more than 50% by weight of the plasticized PVC. Under service conditions, the plasticizer can separate at the surface or transfer into adjacent materials. When plasticized PVC is used there is therefore a risk of contamination of persons and of the environment by the plasticizer. In the light of these problems, there have recently been increasing requirements that the plasticizers used are harmless to humans and are not bioaccumulative.

According to European Union Directive 2005/84/EC, the plasticizers di(2-ethylhexyl)phthalate, dibutyl phthalate and benzyl butyl phthalate, for example, can no longer be used in toys or baby products, and the plasticizers diisononyl phthalate, diisodecyl phthalate and di-n-octyl phthalate can no longer be used in toys or baby products which can be placed in children's mouths. In view of these restrictions, which many consumers may regard as worrying and difficult to understand, many producers are proceeding towards general elimination of phthalate-containing plasticizers in the production of plasticized PVC. There is therefore a requirement for phthalate-free plasticizers which achieve the performance level of phthalate-containing plasticizers in relation to processability and service properties.

For the purposes of the present invention, phthalate-free plasticizers are plasticizers which comprise no dialkyl phthalates, in particular plasticizers which comprise less than 0.1% by weight of dialkyl phthalates.

Elimination of phthalate-containing plasticizers has now also become a requirement placed upon adhesion promoter preparations which contain plasticizer, in particular for sensitive applications, such as toys or baby products. There is therefore a major requirement for adhesion promoter preparations which comprise no phthalates but nevertheless have the good adhesion properties of phthalate-containing adhesion promoter preparations of the prior art. A further demand is that the preparations are clear and free from solids, comprise no volatile solvents and have a viscosity below 30 000 mPas, preferably less than 20 000 mPas, at 23° C. that is necessary for good processability. Residual content of diisocyanates is intended to be less than 1.0% by weight, preferably less than 0.5% by weight. However, even residual contents of these types are now being regarded as critical for sensitive applications. No prior art, not even DE 10 2007 034 977 A1, has hitherto described any combination of all of these product properties.

By way of example, the adhesion promoter preparations based on diisononyl phthalate and described in WO 2005 70984 A1 are no longer suitable for sensitive applications. DE 25 51 634 A1 and EP 1 378 529 A1 maintain that isocyanurates which contain isocyanate groups and which are suitable as adhesion promoters, based on TDI, can be produced in any desired solvents, among which are phthalate-free plasticizers. However, the comparative examples given hereinafter show that by no means do all phthalate-free plasticizers give adhesion promoter preparations which meet the requirements described. This also applies to the plasticizers described in DE 10 2007 034 977, based on alkylsulphonic ester of phenol (ASE), which are marketed with trademark Mesamoll®. DE 30 41 732 A1 describes solutions which are suitable as adhesion promoters which comprise isocyanurates which contain isocyanate groups, these however being produced from MDI. These solutions are unsuitable for the abovementioned reasons.

It was therefore an object of the present invention to provide preparations which are suitable as adhesion promoters and which comprise isocyanurates which contain isocyanate groups, where although these comprise phthalate-free plasticizers their mechanical properties, e.g. bond strengths, reach the level of the phthalate-containing adhesion promoter preparations of WO 2005 70984 A1 and at the same time the preparations have minimized residual TDI content together with processable viscosity.

The object is achieved by, and the present invention therefore provides, preparations characterized in that these comprise A) from 15 to 50% by weight of isocyanurate containing isocyanate groups
B) from 84.99 to 49.99% by weight of n- or isoalkyl monobenzoates and
C) a residual content of 2,4-TDI in the range from 0.01 to 0.099% by weight and have a viscosity in the range from 5000 to 18 000 mPas/23° C. (terminal values included), with the proviso that i) the isocyanurate containing isocyanate groups is produced exclusively via trimerization of 2,4-diisocyanatotoluene and ii) the total of all of the percentages by weight is 100%.

In a preferred embodiment, it is also possible that other substances are present, particularly preferably catalysts or catalyst poisons.

In one preferred embodiment of the invention, the n- or isoalkyl monobenzoates used comprise n- or isononyl benzoates.

In one preferred embodiment of the present invention, the viscosity of the preparations of the invention is in the range from 7000 to 16 000 mPas/23° C. (terminal values included), particularly preferably in the range from 8000 to 14 000 mPas/23° C. (terminal values included).

In one preferred embodiment of the present invention, the residual 2,4-TDI content of the preparations of the invention is from 0.01 to 0.099% by weight, particularly preferably from 0.01 to 0.05% by weight (terminal values respectively included).

Component A) is produced with use exclusively of 2,4-TDI. One preferred embodiment uses 2,4-TDI with a degree of purity ≥99.5% by weight. In one particularly preferred embodiment, the 2,4-TDI to be used also has a viscosity in the range from 2.9 to 3.1 mPa·s, in particular 3 mPa·s (measured to DIN 53015). In one very particularly preferred embodiment, the 2,4-TDI to be used also has a density of from 1.20 to 1.25 g/ml. in particular 1.22 g/ml (measured to DIN 51757). An example of 2,4-TDI to be used according to the invention is the product Desmodur® T100, which is available commercially from Bayer Material Science AG.

Production of component A) can use at least one Mannich base as catalyst for initiating and accelerating the trimerization reaction of the 2,4-TDI, another result here at relatively high temperatures being selective incorporation of 2,4-TDI. Catalyst systems of this type have phenolic OH groups and N,N-dialkylaminomethyl groups bonded to aromatic systems (alkyl: C1-C3-alkyl chain and/or alkylene chain having from 1 to 18 carbon atoms, where these optionally have oxygen or sulphur as separator).

These groups can be groups distributed over a plurality of molecules, or can be groups positioned on one or more aromatic rings. Compounds used as catalyst systems preferably comprise those which comprise not only hydroxy groups but also aminomethyl groups within one molecule.

It is particularly preferable to use systems which have C1-C3-dialkylaminomethyl groups positioned in ortho-position in relation to aromatic hydroxy groups.

The synthesis of Mannich bases suitable as catalysts is described by way of example in DE 25 51 634 A1 and WO 2005 70984 A 1. Mannich bases to be used with preference are those based on phenol, p-isononylphenol or bisphenol A, where these are obtained via reaction with dimethylamine and formaldehyde, e.g. as in DE-A 2 452 531 or Synth. Commun. (1986), 16, 1401-9. Particular preference is given to Mannich bases based on phenol or bisphenol A.

The catalysts to be used in the form of Mannich bases are used in the form of pure substance or in solution, preferably in a plurality of small portions, or continuously.

Component A) is produced via trimerization of 2,4-diisocyanatotoluene (2,4-TDI) by the known processes described by way of example in WO 2005 70984 A1.

The trimerization is carried out in the presence of plasticizer component B). The trimerization reaction takes place in the temperature range from 40 to 140° C., preferably from 40 to 80° C. When the content of free 2,4-TDI in the reaction mixture is below 0.1% by weight, the trimerization is terminated via thermal decomposition of the catalyst or else preferably via addition of a catalyst poison. The product then comprises from 3 to 7% by weight, preferably from 4.5 to 6% by weight, of isocyanate groups.

It is preferable that the trimerization reaction is finally terminated via addition of at least one catalyst poison. Catalyst poisons preferred for this purpose are those from the group of the protic acids, acyl chlorides or methylating compounds. It is particularly preferable to use alkyl phosphates, in particular dibutyl phosphate, or methyl toluenesulphonate. The preparations of the invention preferably comprise from 0.02 to 4% by weight, particularly preferably from 0.1 to 2% by weight, and very particularly preferably from 0.2 to 1% by weight, of the catalyst poison(s).

The n- or isoalkyl monobenzoate of component B) to be used as plasticizer in the preparation according to the invention preferably comprises <0.1% by weight of dialkyl phthalates and ≥50% by weight of n- or isoalkyl monobenzoate. The n- or isoalkyl monobenzoates are produced via esterification of benzoic acid with monofunctional linear or branched alkyl alcohols, preferably C7- to C10-alcohols.

In one particularly preferred embodiment of the invention, component B) used comprises >90% by weight of n- or isononyl benzoate. The C9-alcohols required for the synthesis of the compounds of component B) are preferably nonanols from the group n-nonanol, methylisopropylpentanol, methylpropylpentanol, trimethylhexanol, ethylmethylhexanol, propylhexanol, dimethylheptanol, ethylheptanol, methyloctanol.

A particularly preferred component B) is a mixture of n- and isononanol benzoates characterized in that only a small proportion of 3,5,5-trimethylhexanol benzoate is present.

A very particularly preferred component B) is a mixture of n- and isononanol benzoates characterized in that a proportion of <10 mol % of 3,5,5-trimethylhexanol benzoate is present.

In contrast to EP 1378 529 A1, the inventive reaction of the 2,4-TDI to give the isocyanurate which contains isocyanate groups is carried out in the absence of a solvent, i.e. without solvent.

For the purposes of the present invention, solvents are volatile organic compounds, known as VOCs (volatile organic compounds) or VVOCs (very volatile organic compounds). For the definition of VOCs, see http://de.wikipedia.org/wiki/Fl%C3%BCchtige_organischeVerbindungen.

For the purposes of the present invention, solvents are organic compounds which as in Directive 1999/13/EC of 11 March 1999 have a vapour pressure of 0.01 kilopascal or more at 293.15 Kelvin and have appropriate volatility under the respective usage conditions, or which as in Directive 2004/42/EC of 24 April 2004 have an initial boiling point of at most 250° C. at a standard pressure of 101.3 kPa.

For the purposes of the present invention, solvents are in particular solvents and diluents commonly used in polyurethane chemistry, e.g. toluene, xylene, cyclohexane, chlorobenzene, butyl acetate, ethyl acetate, ethyl glycol acetate, pentyl acetate, hexyl acetate, methoxypropyl acetate, tetrahydrofuran, dioxane, acetone, N-methylpyrrolidone, methyl ethyl ketone, white spirit, relatively highly substituted aromatic compounds, for example those marketed as Solvent Naphtha®, Solvesso®, Shelisol®, Isopar®, Nappar®, and Diasol®, shear benzene, tetralin, decalin, and alkanes having more than 6 carbon atoms, and also mixtures of solvents of this type.

In one preferred embodiment, preparations of the invention comprise, because of the production process, in addition to A), B) and C), from 0.01 to 2% by weight, particularly preferably from 0.05 to 1% by weight, of Mannich base(s) or degradation products thereof and/or from 0.01 to 2% by weight of catalyst poison.

For clarification, it should be noted that the scope of this invention comprises any desired combination of any of the definitions and parameters mentioned in general terms or in preferred ranges in the present disclosure.

The preparations according to the invention are clear, slightly yellowish to yellowish liquids with surprising stability in storage which, even after storage for a number of weeks, had no tendency towards crystallization or towards formation of precipitates or phase separation. They also feature extremely low content of free 2,4-TDI, even after storage, and this is a particular advantage of the preparations according to the invention because of the relatively low boiling point of this potentially toxic diisocyanate.

In the prior art, preparations that are suitable as adhesion promoters and that involve isocyanurates containing isocyanate groups are best produced via trimerization of diisocyanates in the plasticizer, and the course of the trimerization reaction is influenced not only by the catalyst but also, for example, by the plasticizer used, and it was therefore not to be expected that specifically the combination, essential to the invention, of plasticizer, catalyst and exclusive use of 2,4-TDI would provide adhesion-promoter preparations with the required properties. Comparative Examples 1 to 8 set out below in fact show that the object of this invention cannot be achieved with arbitrarily selected phthalate-free plasticizers and TDI isomer mixtures comprising 2,6-TDI.

However, the present invention also provides a process for producing the preparations according to the invention, characterized in that the trimerization of the 2,4-TDI which is to be used exclusively to give component A) is carried out in the temperature range from 40 to 140° C., preferably from 40 to 80° C., in the presence of plasticizer component B) without solvent and in the presence of at least one Mannich base functioning as catalyst, and as soon as the content of free 2,4-TDI in the reaction mixture is below 0.1% by weight the trimerization is terminated with complete or partial deactivation of the catalyst via thermal decomposition of the catalyst or via addition of at least one catalyst poison.

The process according to the invention preferably uses from 0.01 to 2.0% by weight of the Mannich base to be used as catalyst.

It is preferable that the process according to the invention uses, as catalyst poison, poisons from the group of the protic acids, acyl chlorides or methylating compounds, particularly dibutyl phosphate or methyl toluenesulphonate.

The process according to the invention preferably gives preparations according to the invention which then comprise from 3 to 7% by weight of isocyanate groups, preferably from 4.5 to 6% by weight.

In a preferred embodiment, the preparations according to the invention comprise >90% by weight of n- or isononyl benzoates in the n- or isoalkyl monobenzoates.

In a particularly preferred embodiment, the preparations according to the invention comprise from 20 to 35% by weight of isocyanurate containing isocyanate groups and from 79.99 to 64.99% by weight of n- or isoalkyl monobenzoates, preferably n- or isononyl benzoates.

The preparations according to the invention are suitable as adhesion promoters for plasticized PVC and in particular as adhesion-promoting additions for PVC plastisols. The preparations according to the invention are particularly advantageously used as adhesion promoters between substrates made of synthetic fibres having groups reactive towards isocyanate groups, e.g. polyamide fibres or polyester fibres, and PVC plastisols or flexible PVC melts. It is of course possible to use the solutions according to the invention to improve the adhesion of plasticized PVC and, respectively, PVC plastisols on large-surface-area substrates, for example on foils.

The present invention therefore further provides the use of the preparations according to the invention as adhesion promoters for coating compositions based on plasticized PVC.

An example of a procedure for the use according to the invention of the preparations according to the invention comprises using a printing, doctoring, screening, or spraying method, or an immersion method, to apply the preparations according to the invention to the substrates requiring coating. As a function of item to be produced, one or more adhesion-promoter-free PVC layers is/are applied for example in the form of plastisols or via extrusion- or melt-roll-coating or via lamination to the substrate surfaces thus pretreated. The preparations according to the invention can also particularly preferably be added to a PVC plastisol before it is applied.

The amounts used of the preparations according to the invention are normally such that the amount of isocyanurates present that contain isocyanate groups is, based on the coating composition, from 0.5 to 200% by weight, preferably from 1 to 30% by weight. However, it is also possible to use any desired other amounts, appropriate to the respective application sector, of the solutions according to the invention.

The production of the finished layers, i.e. the reaction of the isocyanate groups of the adhesion promoter with the substrate, and the gelling of the PVC layer, takes place, independently of the type of application, in a conventional manner at relatively high temperatures, where temperatures used are from 110 to 210° C., depending on the constitution of the PVC layers.

The present invention also provides coatings and coated substrates for textiles or fabrics, obtainable with use of the adhesion promoter preparations described above. The preparations according to the invention are suitable as adhesion promoters for coatings based on plasticized polyvinyl chloride (PVC), in particular for producing tarpaulins, billboards, air-supported structures and other textile structures, flexible containers, polygonal roofs, awnings, protective apparel, conveyor belts, flock carpets or foamed synthetic leather. The preparations according to the invention have particularly good suitability as adhesion-promoting additives in the coating of substrates having groups reactive towards isocyanate groups, in particular in the coating of yarns, mats and fabrics made of polyester fibres or polyamide fibres.

The present invention therefore also provides coating compositions, preferably based on polyvinyl chloride, characterized in that a preparation according to the invention is used.

The examples below are used to provide further explanation of the invention, but there is no intention that the invention be restricted thereby.

Unless otherwise stated, all parts and percentages are based on weight.

Properties determined on the products were solids content (thick-layer method: lid, 1 g of specimen, 1 h 125° C. convection oven, method based on DIN EN ISO 3251), viscosity at 23° C. (VT550 rotary viscometer from Haake GmbH, Karlsruhe), and also content of free TDI (gas chromatography, Hewlett Packard 5890 in accordance with DIN ISO 55956). Isocyanate content was determined in accordance with EN ISO 11909.

Starting Materials

Desmodur® T80: isomer mixture made of 2,4-diisocyanatotoluene and 2,6-diisocyanatotoluene (80:20), Bayer MaterialScience AG Desmodur® T100: 2,4-diisocyanatotoluene, Bayer MaterialScience AG Vestinol® 9 DINP: diisononyl phthalate, Oxeno GmbH Vestinol® INB: isononyl benzoate, Evonik Benzoflex® 2088: mixture of diethylene glycol dibenzoate, triethylene glycol dibenzoate and dipropylene glycol dibenzoate, Velsicol Chemical Corp.

Unimoll® AGF: acetylated glycerol acetate, Lanxess Deutschland GmbH

Mesamoll® II: phenol ester of alkanesulphonate with ≤0.25% by weight of volatile paraffinic compounds, Lanxess Deutschland GmbH.

Catalyst production: (method based on DE 24 52 532 A1): 94 parts by weight of phenol were heated to 80° C. for two hours with 692 parts by weight of a 25% aqueous dimethylamine solution and 408 parts by weight of a 40% aqueous formaldehyde solution. After cooling, the organic phase was isolated and concentrated by evaporation at 90° C. and 15 mbar. The residue was dissolved in xylene and adjusted to 80% Mannich base concentration. The quantitative data in the examples below are based on this catalyst solution.

COMPARATIVE EXAMPLE 1 (NOT ACCORDING TO THE INVENTION)

180 parts by weight of Desmodur® T80 were trimerized at 50° C. in 504 parts by weight of Vestinol® 9 DINP with 2.9 parts by weight of the catalyst solution. After 84 hours, the reaction was interrupted via addition of 4.7 parts by weight of methyl para-toluenesulphonate, and stirring was continued at from 60 to 70° C. for three hours. This gave a clear solution with 4.7% by weight isocyanate content, with a viscosity of 5700 mPas at 23° C. and with 0.16% by weight content of free TDI.

COMPARATIVE EXAMPLE 2 (NOT ACCORDING TO THE INVENTION)

180 parts by weight of Desmodur® T80 were trimerized at 55° C. in 378 parts by weight of Vestinol® 9 DINP with 1.6 parts by weight of the catalyst solution. After 72 hours, the reaction was interrupted via addition of 2.6 parts by weight of methyl para-toluenesulphonate, and stirring was continued at from 60 to 70° C. for three hours. This gave a clear solution with 5.53% by weight isocyanate content, with a viscosity of 41,400 mPas at 23° C. and with 0,14% by weight content of free TDI.

COMPARATIVE EXAMPLE 3 (NOT ACCORDING TO THE INVENTION)

180 parts by weight of Desmodur® T80 were trimerized at 50° C. in 415 parts by weight of Benzoflex® 2088 with 0.7 parts by weight of the catalyst solution. After 84 hours, the reaction was interrupted via addition of 1.7 parts by weight of methyl para-toluenesulphonate, and stirring was continued at from 60 to 70° C. for three hours. This gave a clear solution with 4.8% by weight isocyanate content, with a viscosity of >200 000 mPas at 23° C. and with 1.09% by weight content of free TDI.

COMPARATIVE EXAMPLE 4 (NOT ACCORDING TO THE INVENTION)

180 parts by weight of Desmodur® T80 were trimerized at 55° C. in 504 parts by weight of Mesamoll® II with 2.9 parts by weight of the catalyst solution. After 72 hours, the reaction was interrupted via addition of 4.7 parts by weight of methyl para-toluenesulphonate, and stirring was continued at from 60 to 70° C. for three hours. This gave a clear solution with 4.8% by weight isocyanate content, with a viscosity of 11 600 mPas at 23° C. and with 0.25% by weight content of free TDI.

COMPARATIVE EXAMPLE 5 (NOT ACCORDING TO THE INVENTION)

180 parts by weight Desmodur® T80 were trimerized at 55° C. in 378 parts by weight of Mesamoll® II with 1.5 parts by weight of the catalyst solution. After 72 hours, the reaction was interrupted via addition of 2.6 parts by weight of methyl para-toluenesulphonate, and stirring was continued at from 60 to 70° C. for three hours. This gave a clear solution with 5.31% by weight isocyanate content, with a viscosity of >300 000 mPas at 23° C. and with 0.15% by weight content of free TDI.

COMPARATIVE EXAMPLE 6 (NOT ACCORDING TO THE INVENTION)

180 parts by weight of Desmodur® T80 were trimerized at 55° C. in 378 parts by weight of Unimoll® AGF with 1.5 parts by weight of the catalyst solution. After 72 hours, the reaction was interrupted via addition of 2.6 parts by weight of methyl para-toluenesulphonate, and stirring was continued at from 60 to 70° C. for three hours. This gave a clear solution with 4.9% by weight isocyanate content, with a viscosity of 35 400 mPas at 23° C. and with 0.42% by weight content of free TDI.

COMPARATIVE EXAMPLE 7 (NOT ACCORDING TO THE INVENTION), 180 parts by weight of Desmodur® T80 were trimerized at 55° C. in 378 parts by weight of Vestinol® INB with 1.5 parts by weight of the catalyst solution. After 54 hours, the reaction was interrupted via addition of 3.4 parts by weight of dibutyl phosphate, and stirring was continued at from 60 to 70° C. for 1 hour. This gave a clear solution with 5.44% by weight isocyanate content, with a viscosity of 9 900 mPas at 23° C. and with 0.4% by weight content of free TDI.

COMPARATIVE EXAMPLE 8 (NOT ACCORDING TO THE INVENTION)

180 parts by weight of Desmodur® T80 were trimerized at 55° C. in 378 parts by weight of Vestinol® INB with 2.0 parts by weight of the catalyst solution. After 100 hours, the reaction was interrupted via addition of 3.4 parts by weight of dibutyl phosphate, and stirring was continued at from 60 to 70° C. for 1 hour. This gave a clear solution with 5.08% by weight isocyanate content, with a viscosity of 160 000 mPas at 23° C. and with 0.09% by weight content of free TDI.

Comparative Example 1 corresponds to Example 2 from EP 1 711 546 A1 and serves for comparison of the properties of the adhesion promoter preparations according to the invention with the prior art. Comparative Example 2 shows that increasing the TIM trimer content to about 32% with use of a plasticizer not according to the invention leads to a prohibitive viscosity increase. As moreover shown by Comparative Examples 1 to 6, not according to the invention, the selection of the plasticizer has a decisive effect on the trimerization result. When the phthalate-free plasticisers described in the prior art are used, the desired property combination cannot be achieved, or can be achieved only if the concentration of TDI trimer does not exceed about 27% by weight. The adhesion promoters either lose their processability because of high viscosity or give inadequate adhesion values because their TDI trimer concentration is inadequate. (See below.) Although Comparative Example 7 gives the desired adhesion and viscosity, its content of free TDI is too high. None of the products according to Comparative Examples 1-7 has the desired content of <0.1% by weight of free TDI. In Example 8 the trimerization is driven to a point that gives <0.1% by weight TDI content. However, viscosity at 23° C. rises here to >100 000 mPas, and the product therefore loses its processability as adhesion promoter.

INVENTIVE EXAMPLE 1 (ACCORDING TO THE INVENTION)

180 parts of Desmodur® T100 were trimerized at 55° C. in 378 parts of Vestinol® INB with 1.5 parts of the catalyst solution. After 48 hours, the reaction was interrupted via addition of 3.4 parts of dibutyl phosphate, and stirring was continued at from 60 to 70° C. for 1 hour. This gave a clear solution with 5.24% isocyanate content, with a viscosity of 8 200 mPas at 23° C. and with <0.03% by weight content of free TDI.

The desired combination of low viscosity and <0.1% by weight content of free TDI is achieved only by using Desmodur® T100.

Performance Testing and Test Results:

In a test system providing conditions close to those encountered in actual applications, polyester fabric was provided with a PVC plastisol/adhesion promoter coating. The bond strength of this coating was then determined on a standardized test strip. To this end, a doctor was used to provide polyester fabrics respectively with an adhesive coat containing adhesion promoter and a top coat of otherwise identical constitution but free from adhesion promoter. These coatings were gelled in an oven and passed for further testing. To test bond strength, two test strips were mutually superposed (PVC side on PVC side), pressed using low pressure, and tested by means of a tensile machine.

Test Equipment:
  Balance: accuracy min. 0.1 g
  Stirrer: high-rotation-rate stirrer bar
  Mathis Labcoater oven system from Mathis AG, Zurich
  Ametek LR5 K plus tensile machine
  Polyester fabric: standard polyester 1100 dtex L 9/9 Z 60 fabric
  Fabric specimens used for testing measured about 40×25 cm.

Constitution of PVC Plastisol:
  70 parts of Vestolit® B 7021 Ultra paste PVC; Vestolit GmbH, Marl
  30 parts of Vestalit® E 7031 paste PVC; Vestolit GmbH, Marl
  33 parts of Mesamoll® ASEP plasticizer; Lanxess Deutschland GmbH
  33 parts of Vestinol® 9 DINP plasticizer; Evonik Oxeno GmbH, Marl
  10 parts of Durcal® 5 chalk; Omya GmbH, Cologne
  2.5 parts of Mark® BZ 513 stabilizer; Crompton Vinyl Additives GmbH, Lampertheim
  1.5 parts of Kronos® 2220 titanium dioxide; Kronos Titan GmbH, Leverkusen Test Specimens:

| | | |
|---|---|---|
| 1. Adhesive coat | about 120 g/m$^2$ | 140° C./2 min |
| 2. Top coat | about 120 g/m$^2$ | 140° C./2 min |

The test specimens were pressed and welded at 180° C. for 2 min.

Dimensions: width 5 cm×length 25 cm in weft yarn direction Tensile machine used for testing: Ametek LR5 K plus.

The PVC plastisol was produced by mixing the starting materials listed under "Constitution of PVC plastisol" above in a Drais mixer, by stirring for 2.5 hours at maximum rotation rate, with water cooling and in vacuo.

Adhesive Coat:

Bond strengths were then determined on these specimens by using an Ametek LR 5 K plus tensile machine. The resultant bond strength values are the force in Newtons required to peel 10 cm of the coating from the backing fabric (peel test, presented as Effectiveness in the table). The values given in the table were obtained by averaging at least three individual measurements.

As shown by the test result for Example 1, use of the phthalate-free adhesion promoter preparations according to the invention provides higher bond strength values than those achieved with the phthalate-containing adhesion promoter preparation of the prior art (Comparative Examples 1 and 2). The adhesion promoters from Comparative Examples 3 and 5 were not suitable for further processing, since their viscosity was too high to give homogeneous coatings. Comparative Examples 4 and 6 exhibit inadequate bond strength values. Comparative Example 7 exhibits acceptable Effectiveness and Viscosity, but residual content of free 2,4-TDI is too high. Comparative Example 8 exhibits a residual content of less than 0.1% by weight of 2,4-TDI, but cannot be tested for Effectiveness because its viscosity is much too high. Residual content of 2,4-TDI in Comparative Examples 1 to 7 is always above 0.1% by weight.

Test Results:

| Example | | Viscosity | Effectiveness |
|---|---|---|---|
| Comparative Example 1 | not according to the invention | 5700 mPas | 153 |
| Comparative Example 2 | not according to the invention | 41 400 mPas | 156 |
| Comparative Example 3 | not according to the invention | >200 000 mPas | Could not be tested |
| Comparative Example 4 | not according to the invention | 11 600 mPas | 148 |
| Comparative Example 5 | not according to the invention | >300 000 mPas | Could not be tested |
| Comparative Example 6 | not according to the invention | 35 400 mPas | 133 |
| Comparative Example 7 | not according to the invention | 9900 mPas | 171 |
| Comparative Example 8 | not according to the invention | 160 000 mPas | Could not be tested |
| Inventive Example 1 | according to the invention | 8200 mPas | 171 |

What we claim is:

1. A composition comprising:
   A) from 15 to 50% by weight isocyanurate containing isocyanate groups,
   B) from 84.99 to 49.99% by weight n-alkyl monobenzoates or isoalkyl monobenzoates, and
   C) from 0.01 to 0.099% by weight 2,4-toluene diisocyanate (2,4-TDI),
   wherein the composition has a viscosity of 5,000 mPas/23° C. to 18,000 mPas/23° C., with the proviso that:
   i) the isocyanurate containing isocyanate groups is produced by trimerization of 2,4-TDI and
   ii) the total of all the percentages by weight is 100%.

2. The composition of claim 1, wherein the n-alkyl monobenzoates or isoalkyl monobenzoates comprise greater than 90% by weight n-nonyl benzoate or isononyl benzoate.

3. The composition of claim 1, comprising 20 to 35% by weight isocyanurate containing isocyanate groups and 79.99 to 64.99% by weight of n-alkyl monobenzoates or isoalkyl monobenzoates.

4. An adhesion promoter for coating compositions based on plasticized polyvinyl chloride comprising the composition of claim 1.

5. A substrate comprising the adhesion promoter of claim 4.

6. An article comprising the substrate of claim 5, wherein the article is selected from the group consisting of tarpaulins, billboards, air-supported structures and other textile structures, flexible containers, polygonal roofs, awnings, protective apparel, conveyor belts, flock carpets and foamed synthetic leather.

7. The substrate of claim 5, wherein the substrate has an underlying structure comprising textiles or fabrics.

8. The substrate of claim 7, wherein the fabrics are textile polyester fabrics or textile polyamide fabrics.

9. A process for production of the composition of claim 1, comprising trimerizing 2,4-TDI to produce component A) at a temperature of 40° C. to 140° C. in the presence of component B) without solvent and in the presence of at least one Mannich base functioning as catalyst, and terminating the trimerization with complete or partial deactivation of the catalyst by thermal decomposition of the catalyst or by addition of at least one catalyst poison as soon as the content of free 2,4-TDI in the reaction mixture is below 0.1% by weight.

10. The process of claim 9, wherein the amount of the Mannich base is from 0.01 to 2.0% by weight of the total composition.

11. The process of claim 9, wherein the catalyst poison is selected from the group consisting of protic acids, acyl chlorides, dibutyl phosphate and methyl toluenesulfonate.

12. A coating composition comprising the composition of claim 1.

* * * * *